United States Patent
Zhong et al.

(10) Patent No.: US 11,252,864 B2
(45) Date of Patent: Feb. 22, 2022

(54) METHOD AND SYSTEM FOR PATH PLANNING AFTER REMOVING OR ADDING OBSTACLE FROM/TO LAWN TO BE MOWED

(71) Applicant: Chongqing Rato Intelligent Equipment Co., LTD., Chongqing (CN)

(72) Inventors: Wei Zhong, Chongqing (CN); Zhe Niu, Chongqing (CN); Hao Wang, Chongqing (CN); Yuanyuan Chen, Chongqing (CN); Yuan Cheng, Chongqing (CN)

(73) Assignee: CHONGQING RATO INTELLIGENT EQUIPMENT CO., LTD., Chongqing (CN)

( * ) Notice: Subject to any disclaimer, the term of this patent is extended or adjusted under 35 U.S.C. 154(b) by 144 days.

(21) Appl. No.: 16/782,058

(22) Filed: Feb. 4, 2020

(65) Prior Publication Data

US 2020/0170181 A1 Jun. 4, 2020

(30) Foreign Application Priority Data

Mar. 1, 2019 (CN) .......................... 201910156852.2

(51) Int. Cl.
*A01D 34/00* (2006.01)
*G05D 1/00* (2006.01)
*G05D 1/02* (2020.01)

(52) U.S. Cl.
CPC ......... *A01D 34/008* (2013.01); *G05D 1/0088* (2013.01); *G05D 1/0219* (2013.01); *G05D 1/0221* (2013.01); *G05D 1/0238* (2013.01); *G05D 2201/0208* (2013.01)

(58) Field of Classification Search
CPC .. A01D 34/008; G05D 1/0088; G05D 1/0238; G05D 1/0221; G05D 1/0219; G05D 1/0274; G05D 2201/0208
See application file for complete search history.

(56) References Cited

U.S. PATENT DOCUMENTS

| 9,538,702 | B2 * | 1/2017 | Balutis | ..................... B25J 5/007 |
|---|---|---|---|---|
| 2017/0150676 | A1 * | 6/2017 | Yamauchi | ............ G05D 1/0236 |
| 2018/0004217 | A1 * | 1/2018 | Biber | .................... G05D 1/0274 |
| 2019/0163174 | A1 * | 5/2019 | Ko | ........................ G05D 1/0044 |
| 2021/0132624 | A1 * | 5/2021 | Andriolo | ............... A47L 9/2852 |

* cited by examiner

*Primary Examiner* — Michael J Zanelli
(74) *Attorney, Agent, or Firm* — Cheng-Ju Chiang

(57) ABSTRACT

The present disclosure discloses a method for path planning after removing an obstacle from a lawn to be mowed, the method including: starting a boundary editing interface for the lawn to be mowed to display inner boundary information; detecting an obstacle selection and removal instruction of a user; deleting information data that is stored in a memory and/or database and associated with the information mark of the obstacle to be removed; reloading all currently-stored boundary information; and displaying the updated schematic diagram of the lawn and the updated path planning information on a display screen. The present disclosure also discloses a method and system for path planning after adding an obstacle to a lawn to be mowed, and a system for path planning after removing an obstacle from a lawn to be mowed.

8 Claims, 5 Drawing Sheets

METHOD AND SYSTEM FOR PATH PLANNING AFTER REMOVING OR ADDING OBSTACLE FROM/TO LAWN TO BE MOWED

TECHNICAL FIELD

The present disclosure relates to the field of intelligent mower technology, and in particular to a method and system for path planning after removing or adding an obstacle from/to a lawn to be mowed.

BACKGROUND

For high-end areas such as gardens and golf courses, garden mowing robots emerge in response to special mowing requirements. Traditional mowing robots are mostly controlled relying on remote control, which does not completely liberate humans from a mowing task in a strict sense, but on the contrary, forces people to always pay close attention to the running state of the robots. Although users no longer need to operate lawn mowers in practice, the operating requirements for the users are increased, which runs counter to the tendency of intelligence. In addition, after the traditional intelligent mowing robots complete the construction of a schematic diagram of a lawn to be mowed, external conditions such as the addition or removal of obstacles will seriously affect the path planning in a currently generated automatic task. At this time, if the current data is used to continue the automatic mowing, apparently, the mowing task cannot be completed, or a satisfactory mowing effect cannot be achieved. Although the mowing robot can automatically avoid obstacles based on boundary reduction, the obstacle reduction information cannot be predicted. Thus, the robot still believes that there are obstacles in the algorithm at the moment, and will perform a series of obstacle avoidance operations, which greatly reduces the mowing efficiency. The root cause of the above situation is lack of a complete set of automatic correction logic for boundary processing with respect to this situation.

SUMMARY

An object of the present disclosure is to provide a method for path planning after removing an obstacle from a lawn to be mowed, and the method includes:

starting a boundary editing interface for the lawn to be mowed to display inner boundary information, outer boundary information and path planning information of a current task;

detecting an obstacle selection and removal instruction of a user, and querying an information mark corresponding to an obstacle to be removed according to the instruction;

deleting information data stored in a memory and/or database and associated with the information mark of the obstacle to be removed;

reloading all currently-stored boundary information, and generating a schematic diagram of the lawn to be mowed and path planning information according to a preset algorithm; and displaying the updated schematic diagram of the lawn and the updated path planning information on a display screen.

The present disclosure further discloses a method for path planning after adding an obstacle to a lawn to be mowed, and the method includes:

starting a boundary editing interface for the lawn to be mowed to display inner boundary information, outer boundary information and path planning information of a current task;

detecting an obstacle selection and addition instruction of a user, and deleting the path planning information and a schematic diagram of the lawn to be mowed, which are stored in a memory and/or database and associated with the current task, according to the instruction;

remotely controlling or driving an intelligent mower on the lawn to be mowed for a teaching operation;

acquiring inner boundary information corresponding to an obstacle to be added through teaching, and storing the inner boundary information;

reloading all currently-stored boundary information, and generating a schematic diagram of the lawn to be mowed and path planning information according to a preset algorithm; and displaying the updated schematic diagram of the lawn and the updated path planning information on a display screen.

Among them, before starting the boundary editing interface for the lawn to be mowed, the method further includes the following steps:

remotely controlling or driving an intelligent mower on the lawn to be mowed for a teaching operation;

acquiring inner boundary information and outer boundary information of the lawn to be mowed through teaching;

generating a schematic diagram of the lawn to be mowed, path planning information, and task information according to the inner boundary information and the outer boundary information of the lawn to be mowed, as well as the preset algorithm; and storing the inner boundary information, the outer boundary information, the schematic diagram of the lawn to be mowed, the path planning information, and the task information.

The present disclosure further provides a system for path planning after removing an obstacle from a lawn to be mowed, and the system includes:

a boundary editing module configured to start a boundary editing interface for the lawn to be mowed to display inner boundary information, outer boundary information and path planning information of a current task;

an instruction input module configured to detect an obstacle selection and removal instruction of a user, and query an information mark corresponding to an obstacle to be removed according to the instruction;

a data deleting module configured to delete information data that is stored in a memory and/or database and that is associated with the information mark of the obstacle to be removed;

a path planning module configured to reload all currently-stored boundary information, and generate a schematic diagram of the lawn to be mowed and path planning information according to a preset algorithm; and a display module configured to display the updated schematic diagram of the lawn and the updated path planning information.

The present disclosure further discloses a system for path planning after adding an obstacle to the lawn to be mowed, and the system includes:

a boundary editing module configured to start a boundary editing interface for the lawn to be mowed to display inner boundary information, outer boundary information and path planning information of a current task;

a data deleting module configured to detect an obstacle selection and addition instruction of a user, and delete the path planning information and a schematic diagram of the lawn to be mowed, which are stored in a memory and/or database and associated with the current task, according to the instruction;

a teaching module configured to remotely control or drive an intelligent mower on the lawn to be mowed for a teaching operation;

a storage module configured to acquire inner boundary information corresponding to an obstacle to be added through teaching, and store the inner boundary information;

a path planning module configured to reload all currently-stored boundary information, and generate a schematic diagram of the lawn to be mowed and path planning information according to a preset algorithm; and a display module configured to display the updated schematic diagram of the lawn and the updated path planning information.

With the method and system for automatic boundary processing after moving or adding the obstacle for the intelligent mower according to the present disclosure, one set of complete processing logic can be created after the obstacle is internally added to or removed from the boundary. In this logic, data rollback operations and abnormal operations are omitted so that the atomicity of the task can be guaranteed. Through the operations above, the updated data stream can be obtained on an upper display end, the data can be automatically synchronized internally, and all data sets can be updated without any movement of the mower, thereby completely avoiding the clumsy processing of the traditional method and greatly improving the efficiency of the production task.

DETAILED DESCRIPTION

Figure 1:
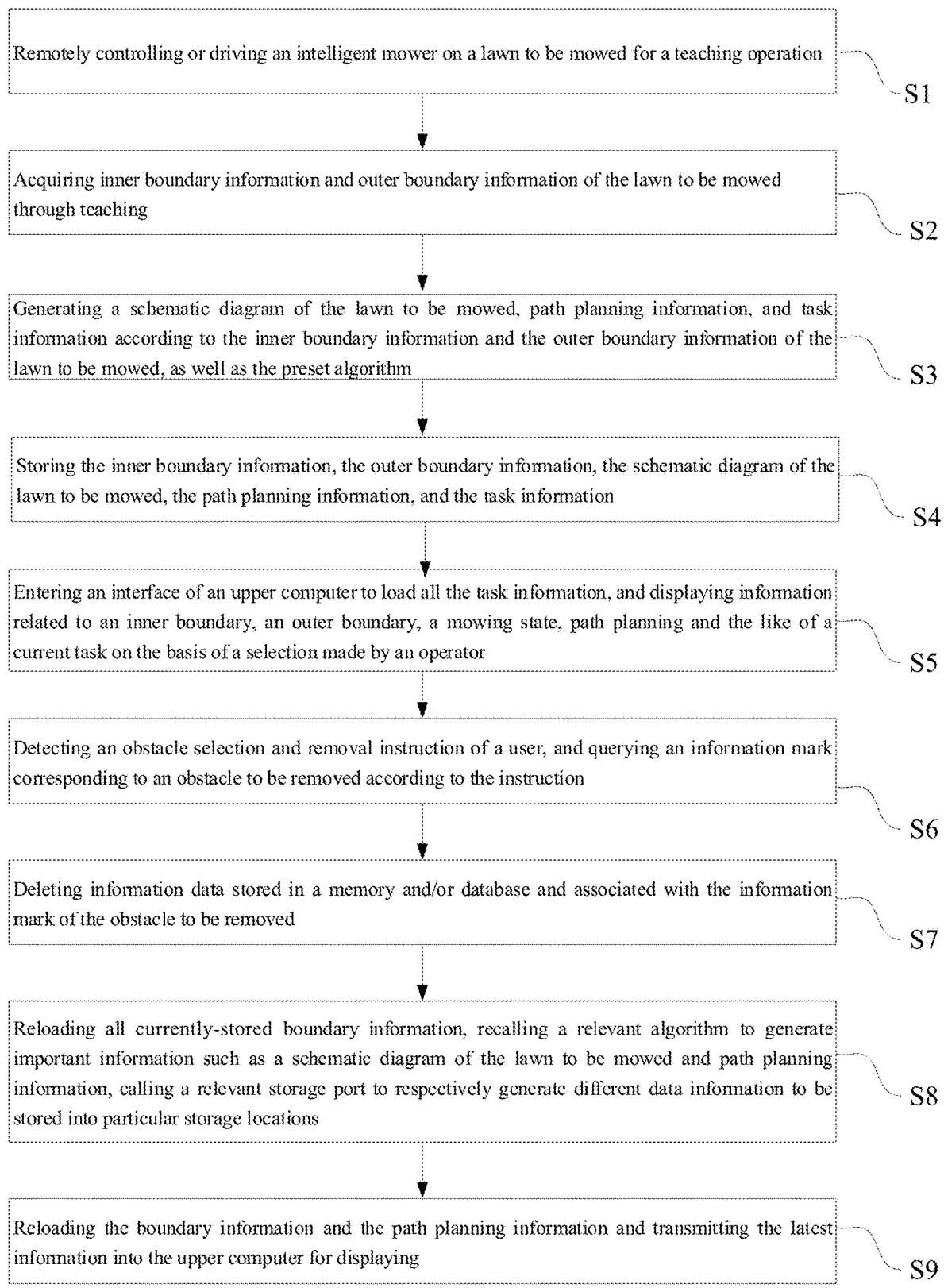
FIG. 1 is a flowchart of a method for path planning after removing an obstacle from a lawn to be mowed according to a preferred embodiment of the present disclosure.

Referring to FIG. 1, a flowchart of a method for path planning after removing an obstacle from a lawn to be mowed according to a preferred embodiment of the present disclosure is shown. The method for path planning after removing the obstacle from the lawn to be mowed according to the preferred embodiment includes the following steps.

In step S1, an intelligent mower is remotely controlled or driven on the lawn to be mowed for a teaching operation.

In step S2, inner boundary information and outer boundary information of the lawn to be mowed are acquired through teaching.

In step S3, a schematic diagram of the lawn to be mowed, path planning information, and task information are acquired according to the inner boundary information and the outer boundary information of the lawn to be mowed, as well as a preset algorithm.

In step S4, the inner boundary information, the outer boundary information, the schematic diagram of the lawn to be mowed, the path planning information, and the task information are stored.

In step S5, an interface of an upper computer is entered to load all the task information, and information related to an inner boundary, an outer boundary, a mowing state, path planning and the like of a current task are displayed on the basis of a selection made by an operator. In this embodiment, the upper computer is configured to display information related to the inner boundary, the outer boundary, the mowing state, the path planning and the like of the current task, and may enable a human-computer interaction function.

In step S6, an obstacle selection and removal instruction of a user is detected, and an information mark corresponding to an obstacle to be removed is queried according to the instruction.

In step S7, information data stored in a memory and/or database and associated with the information mark of the obstacle to be removed are deleted. In this embodiment, the information data associated with the information mark of the obstacle to be removed includes: the inner boundary information, the path planning information and the schematic diagram of the lawn to be mowed, which are associated with the information mark of the obstacle to be removed.

In step S8, all currently-stored boundary information is reloaded; a relevant algorithm is recalled to generate important information such as a schematic diagram of the lawn to be mowed and path planning information; and a relevant storage port is called to generate different pieces of data information respectively to be stored into particular storage locations.

In step S9, the boundary information and the path planning information are reloaded; and the latest information is transmitted to a display screen of the upper computer for displaying.

Figure 2:
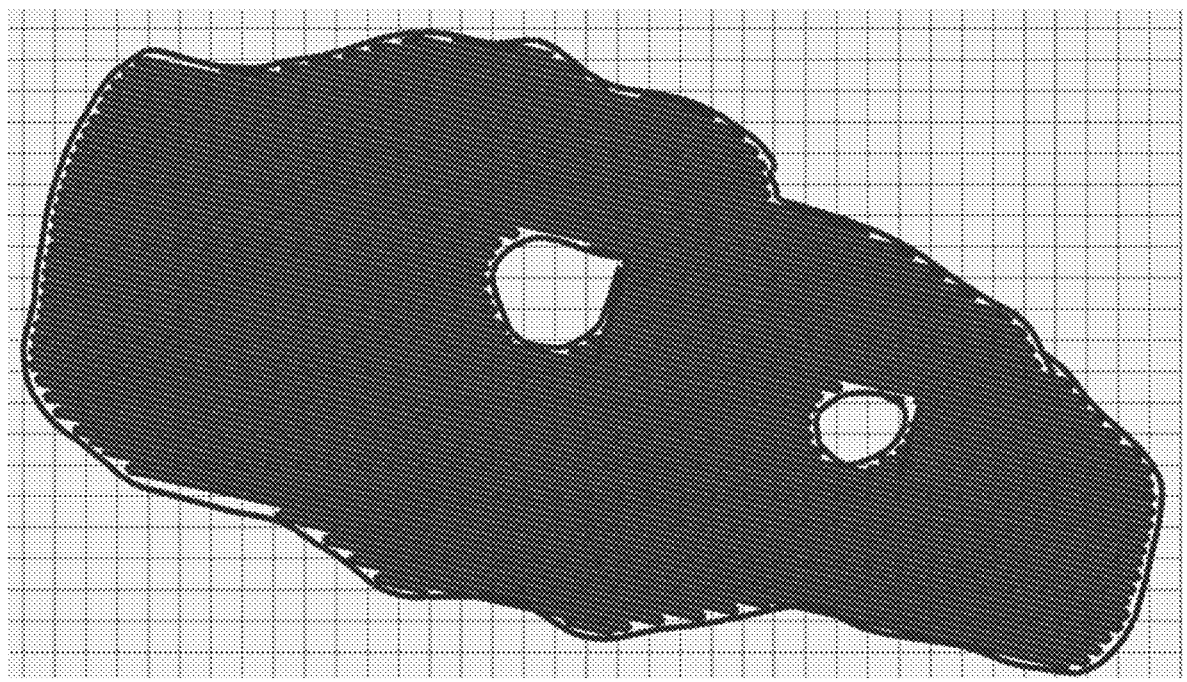
FIG. 2 and FIG. 3 are schematic diagrams of path planning for a current task loaded by an intelligent mower.
Figure 3:
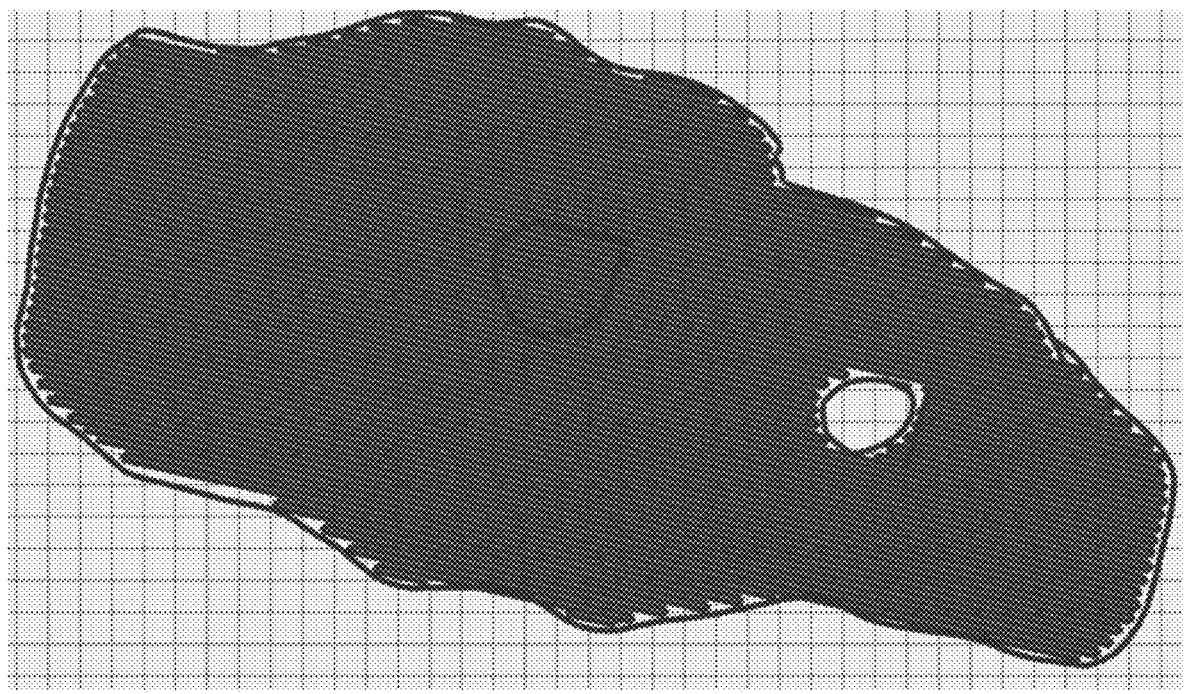

As shown in FIG. 2 and FIG. 3, a complete data update process can be implemented through the steps above. As can be clearly seen from the drawings, a more reasonably planned path is obtained by loading the latest approach when a piece of boundary information is removed. Complicated problems caused when all the obstacles are removed are solved by a simple human-computer interaction process on the upper computer.

Figure 4:
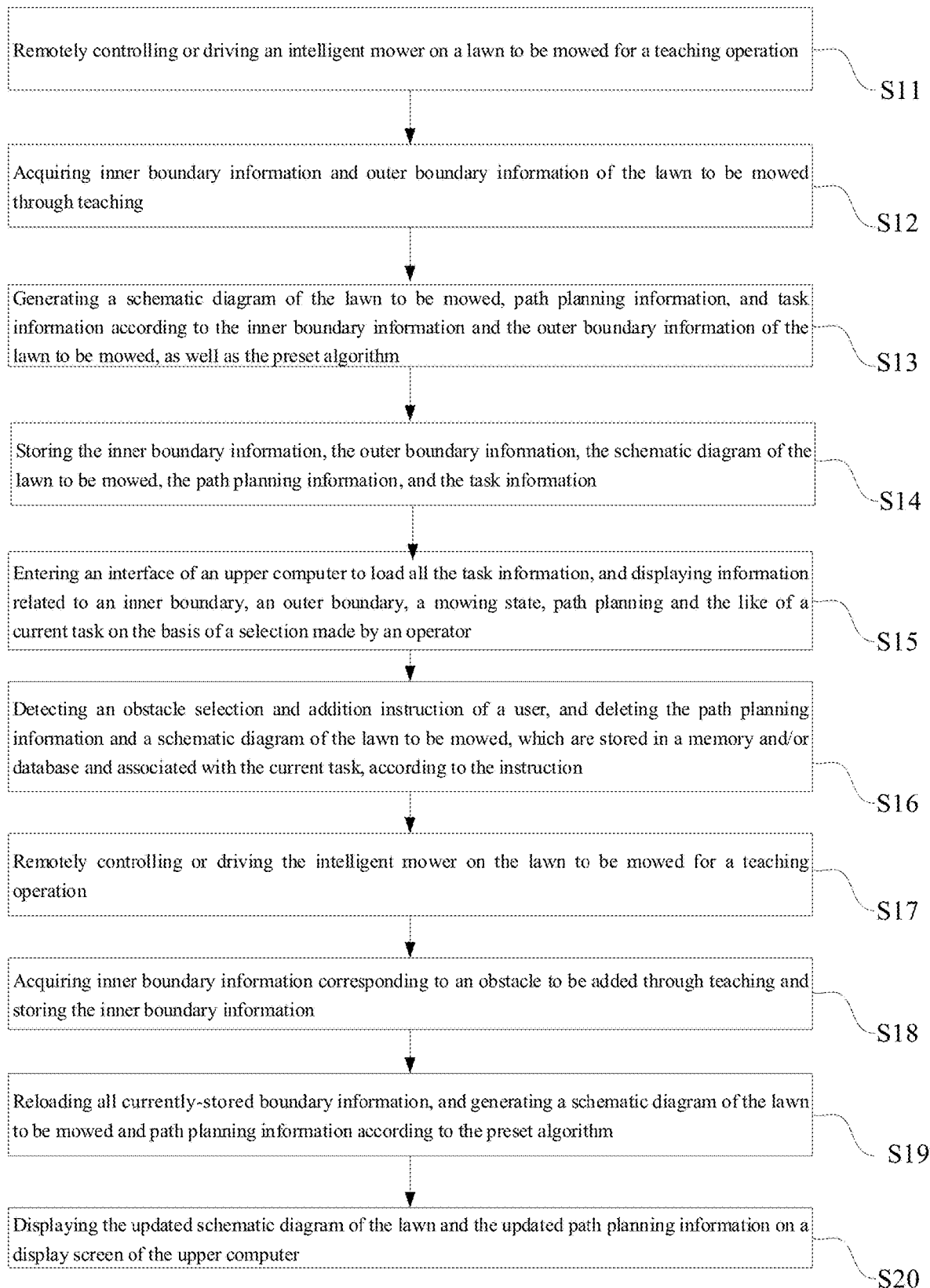
FIG. 4 is a flowchart of a method for path planning after adding an obstacle to a lawn to be mowed according to a preferred embodiment of the present disclosure.

Continuing referring to FIG. 4, a flowchart of a method for path planning after adding an obstacle to a lawn to be mowed according to a preferred embodiment of the present disclosure is shown. If unprocessed obstacle data (such as, a fast-growing tree) exist in a task area, the method for path planning after adding the obstacle to the lawn to be mowed according to the preferred embodiment includes the following steps.

In step S11, an intelligent mower is remotely controlled or driven on the lawn to be mowed for a teaching operation.

In step S12, inner boundary information and outer boundary information of the lawn to be mowed are acquired through teaching.

In step S13, a schematic diagram of the lawn to be mowed, path planning information, and task information are generated according to the inner boundary information and the outer boundary information of the lawn to be mowed, as well as a preset algorithm.

In step S14, the inner boundary information, the outer boundary information, the schematic diagram of the lawn to be mowed, the path planning information, and the task information are stored.

In step S15, an interface of an upper computer is entered to load all the task information, and information related to an inner boundary, an outer boundary, a mowing state, path planning and the like of a current task is displayed on the basis of a selection made by an operator.

In step S16, an obstacle selection and addition instruction of a user is detected, and the path planning information and a schematic diagram of the lawn to be mowed, which are stored in a memory and/or database and associated with the current task, according to the instruction, are deleted.

In step S17, the intelligent mower is remotely controlled or driven on the lawn to be mowed for a teaching operation.

In step S18, inner boundary information corresponding to an obstacle to be added is acquired through teaching, and is stored.

In step S19, all currently-stored boundary information is reloaded; and a schematic diagram of the lawn to be mowed and path planning information are generated according to the preset algorithm.

In step S20, the updated schematic diagram of the lawn and the updated path planning information are displayed on a display screen.

Figure 5:
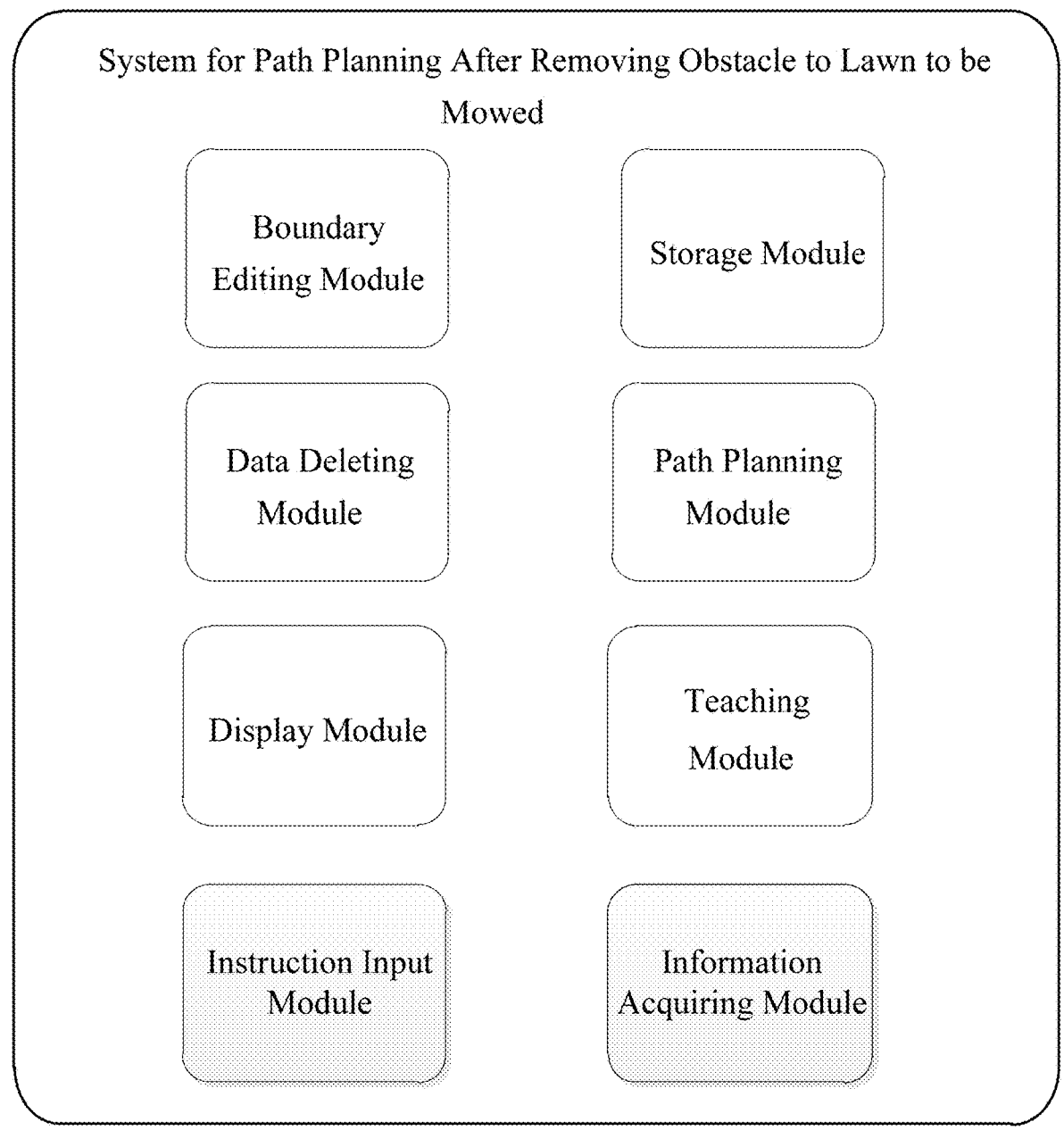
FIG. 5 is a block diagram of a system for path planning after adding an obstacle to a lawn to be mowed according to a preferred embodiment of the present disclosure.

Continuing referring to FIG. 5, a block diagram of a system for path planning after removing an obstacle from a lawn to be mowed according to a preferred embodiment of the present disclosure is shown. The system for path planning after removing the obstacle from the lawn to be mowed according to the preferred embodiment includes a boundary editing module, an instruction input module, a data deleting module, a path planning module, a display module, a teaching module, an information acquiring module, and a storage module. The boundary editing module is configured to start a boundary editing interface for the lawn to be mowed to display inner boundary information, outer boundary information and path planning information of a current task. The instruction input module is configured to detect an obstacle selection and removal instruction of a user, and query an information mark corresponding to an obstacle to be removed according to the instruction. The data deleting module is configured to delete information data that is stored in a memory and/or database and that is associated with the information mark of the obstacle to be removed. The path planning module is configured to reload all currently-stored boundary information, and generate a schematic diagram of the lawn to be mowed and path planning information according to a preset algorithm, and is further configured to generate a schematic diagram of the lawn to be mowed, path planning information, and task information according to the inner boundary information and the outer boundary information of the lawn to be mowed, as well as the preset algorithm. The display module is configured to display the updated schematic diagram of the lawn and the updated path planning information. The teaching module is configured to remotely control or drive an intelligent mower on the lawn to be mowed for a teaching operation. The information acquiring module is configured to acquire inner boundary information and outer boundary information of the lawn to be mowed through teaching. The storage module is configured to store the inner boundary information, the outer boundary information, the schematic diagram of the lawn to be mowed, the path planning information, and the task information. In this embodiment, the information data associated with the information mark of the obstacle to be removed includes: the inner boundary information, the path planning information and the schematic diagram of the lawn to be mowed, which are associated with the information mark of the obstacle to be removed.

Continuing referring to FIG. 5, a block diagram of a system for path planning after adding an obstacle to a lawn to be mowed according to a preferred embodiment of the present disclosure is shown. The system for path planning after removing the obstacle from the lawn to be mowed according to the preferred embodiment includes a boundary editing module, a data deleting module, a teaching module, a storage module, a path planning module, and a display module. The boundary editing module is configured to start a boundary editing interface for the lawn to be mowed to display inner boundary information, outer boundary information and path planning information of a current task. The data deleting module is configured to detect an obstacle selection and addition instruction of a user, and delete the path planning information and a schematic diagram of the lawn to be mowed, which are stored in a memory and/or database and associated with the current task, according to the instruction. The teaching module is configured to remotely control or drive an intelligent mower on the lawn to be mowed for a teaching operation. The storage module is configured to acquire inner boundary information corresponding to an obstacle to be added through teaching and store the inner boundary information, and is further configured to acquire the outer boundary information and task information of the lawn to be mowed through teaching. The path planning module is configured to reload all currently-stored boundary information, and generate a schematic diagram of the lawn to be mowed and path planning information according to a preset algorithm. The display module is configured to display the updated schematic diagram of the lawn and the updated path planning information.

With the method and system for path planning after removing or adding the obstacle from/to the lawn to be mowed according to the present disclosure, one set of complete processing logic can be created after the obstacle is internally added to or removed from the boundary. In this logic, data rollback operations and abnormal operations are omitted so that the atomicity of the task can be guaranteed. Through the operations above, the updated data stream can be obtained on an upper display end, the data can be automatically synchronized internally, and all data sets can be updated without any movement of the mower, thereby completely avoiding the clumsy processing of the traditional method and greatly improving the efficiency of the production task.

What is claimed is:

1. A method for path planning after removing an obstacle from a lawn to be mowed, wherein the method for path planning comprises:
   starting a boundary editing interface for the lawn to be mowed to display inner boundary information, outer boundary information and path planning information of a current task;
   detecting an obstacle selection and removal instruction of a user, and querying an information mark corresponding to an obstacle to be removed according to the instruction;
   deleting information data stored in a memory and/or database and associated with the information mark of the obstacle to be removed;
   reloading all currently-stored boundary information, and generating a schematic diagram of the lawn to be mowed and path planning information according to a preset algorithm; and
   displaying the updated schematic diagram of the lawn and the updated path planning information on a display screen.

2. The method for path planning after removing the obstacle from the lawn to be mowed according to claim 1, wherein before starting the boundary editing interface for the lawn to be mowed, the method further comprises:

remotely controlling or driving an intelligent mower on the lawn to be mowed for a teaching operation;

acquiring inner boundary information and outer boundary information of the lawn to be mowed through teaching;

generating a schematic diagram of the lawn to be mowed, path planning information, and task information according to the inner boundary information and the outer boundary information of the lawn to be mowed, as well as the preset algorithm; and storing the inner boundary information, the outer boundary information, the schematic diagram of the lawn to be mowed, the path planning information, and the task information.

3. The method for path planning after removing the obstacle from the lawn to be mowed according to claim 2, wherein the information data associated with the information mark of the obstacle to be removed comprises: the inner boundary information, the path planning information and the schematic diagram of the lawn to be mowed, which are associated with the information mark of the obstacle to be removed.

4. A method for path planning after adding an obstacle to the lawn to be mowed, wherein the method for path planning comprises:

starting a boundary editing interface for the lawn to be mowed to display inner boundary information, outer boundary information and path planning information of a current task;

detecting an obstacle selection and addition instruction of a user, and deleting the path planning information and a schematic diagram of the lawn to be mowed, which are stored in a memory and/or database and associated with the current task, according to the instruction;

remotely controlling or driving an intelligent mower on the lawn to be mowed for a teaching operation;

acquiring inner boundary information corresponding to an obstacle to be added through teaching, and storing the inner boundary information;

reloading all currently-stored boundary information, and generating a schematic diagram of the lawn to be mowed and path planning information according to a preset algorithm; and displaying the updated schematic diagram of the lawn and the updated path planning information on a display screen.

5. The method for path planning after adding the obstacle to the lawn to be mowed according to claim 4, wherein before starting the boundary editing interface for the lawn to be mowed, the method further comprises the following steps:

remotely controlling or driving an intelligent mower on the lawn to be mowed for a teaching operation;

acquiring inner boundary information and outer boundary information of the lawn to be mowed through teaching;

generating a schematic diagram of the lawn to be mowed, path planning information, and task information according to the inner boundary information and the outer boundary information of the lawn to be mowed, as well as the preset algorithm; and storing the inner boundary information, the outer boundary information, the schematic diagram of the lawn to be mowed, the path planning information, and the task information.

6. A system for path planning after removing an obstacle from a lawn to be mowed, wherein the system comprises:

a boundary editing module configured to start a boundary editing interface for the lawn to be mowed to display inner boundary information, outer boundary information and path planning information of a current task;

an instruction input module configured to detect an obstacle selection and removal instruction of a user, and query an information mark corresponding to an obstacle to be removed according to the instruction;

a data deleting module configured to delete information data stored in a memory and/or database and associated with the information mark of the obstacle to be removed;

a path planning module configured to reload all currently-stored boundary information, and generate a schematic diagram of the lawn to be mowed and path planning information according to a preset algorithm; and a display module configured to display the updated schematic diagram of the lawn and the updated path planning information.

7. The system for path planning after removing the obstacle from the lawn to be mowed according to claim 6, wherein the system further comprises:

a teaching module configured to remotely control or drive an intelligent mower on the lawn to be mowed for a teaching operation;

an information acquiring module configured to acquire inner boundary information and outer boundary information of the lawn to be mowed through teaching;

a storage module configured to store the inner boundary information, the outer boundary information, the schematic diagram of the lawn to be mowed, the path planning information, and the task information;

wherein the path planning module is further configured to generate a schematic diagram of the lawn to be mowed, path planning information, and task information according to the inner boundary information and the outer boundary information of the lawn to be mowed, as well as the preset algorithm.

8. The system for path planning after removing the obstacle from the lawn to be mowed according to claim 7, wherein the information data associated with the information mark of the obstacle to be removed comprises: the inner boundary information, the path planning information and the schematic diagram of the lawn to be mowed, which are associated with the information mark of the obstacle to be removed.

* * * * *